Oct. 28, 1941.　　A. C. KORTE ET AL　　2,260,946
ELECTRIC FUEL PUMP
Filed April 20, 1940　　4 Sheets-Sheet 1

INVENTORS
ALFRED C. KORTE
KENNETH LANNERT
Donald U. Rich
ATTORNEY

Oct. 28, 1941.   A. C. KORTE ET AL   2,260,946
ELECTRIC FUEL PUMP
Filed April 20, 1940   4 Sheets-Sheet 2

INVENTORS
ALFRED C. KORTE
KENNETH LANNERT
Donald U. Rich
ATTORNEY

INVENTORS
ALFRED C. KORTE
KENNETH LANNERT
Donald U. Rich
ATTORNEY

Oct. 28, 1941.    A. C. KORTE ET AL    2,260,946
ELECTRIC FUEL PUMP
Filed April 20, 1940    4 Sheets-Sheet 4

INVENTORS
ALFRED C. KORTE
KENNETH LANNERT

Donald U. Rich

ATTORNEY

Patented Oct. 28, 1941

2,260,946

UNITED STATES PATENT OFFICE 2,260,946

ELECTRIC FUEL PUMP

Alfred C. Korte and Kenneth Lannert, St. Louis, Mo., assignors to Carter Carburetor Corporation, St. Louis, Mo., a corporation of Delaware Application April 20, 1940, Serial No. 330,704

6 Claims. (Cl. 103—111)

This invention relates to automotive fuel pumps and more particularly to electrically operated centrifugal fuel pumps and their installation in fuel supply tanks. It is an improvement of the invention disclosed in our co-pending application, Serial No. 291,588, filed August 23, 1939.

A difficulty encountered when employing production methods by which pumps of the above character may be economically produced is that these methods require certain dimensional tolerances, while on the other hand efficient operation of the device requires that these tolerances be considerably less. This particularly refers to the dimensions of components which effect the alignment and concentricity of the rotor with respect to its bearings, the impeller with respect to the volute and the air-gap between the armature and the poles.

A problem to be solved when mounting electric fuel pumps in fuel storage tanks is the elimination of objectionable noise caused by pump vibration. Although vibration may be reduced to a minimum by proper pump design, it is quite obvious that even vibrations of very small amplitude will be, if not arrested by proper dampening means, transmitted to the comparatively thin metal panels of the supply tank through the mounting and will therein be greatly amplified and resounded.

It is an object of the present invention to provide an improved fuel pump of the above character adapted to economical production.

It is a further object of the present invention to provide novel resilient mounting means for interior tank mounted fuel pumps of the above character, which is universally adaptable.

It is a further object of the present invention to provide a novel electrical conductor for an interior tank mounted fuel pump.

Further objects and advantages will become apparent upon referring to the following description and accompanying drawings in which.

Figure 1:
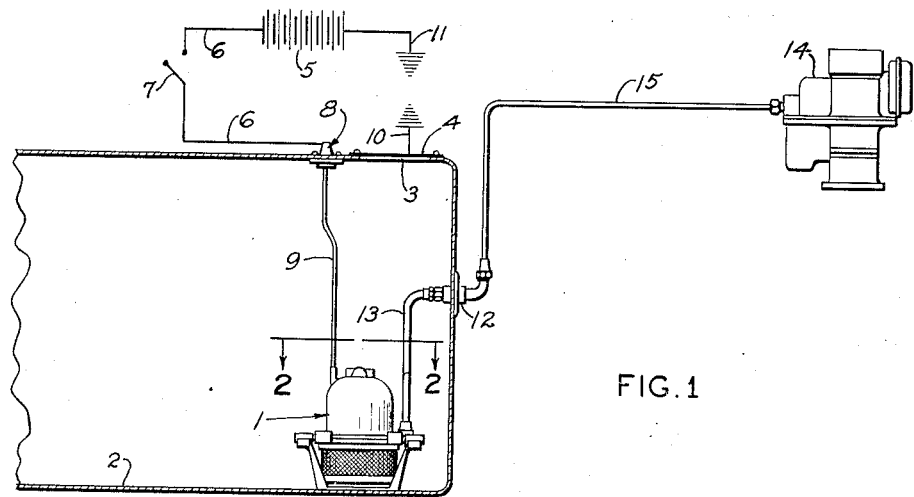
Fig. 1 is a schematic illustration of a fuel supply system for an internal combustion engine comprising a fuel pump and mounting constructed in accordance with the present invention.
Figure 2:
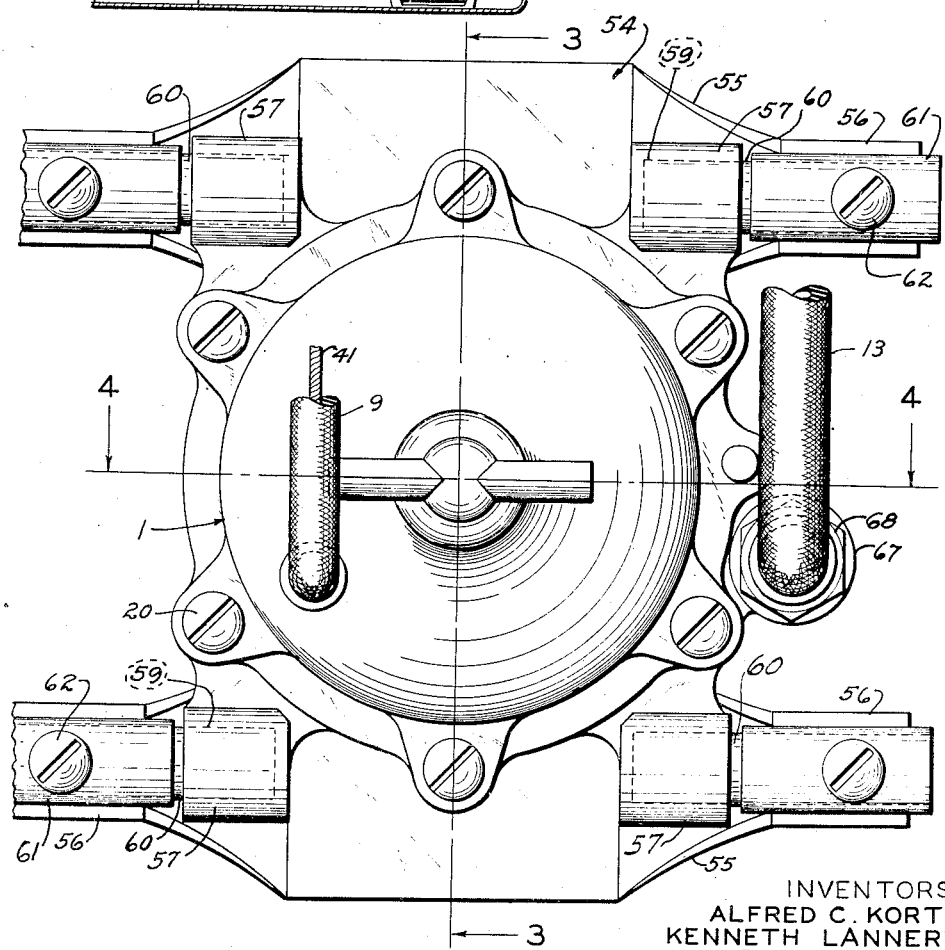
Fig. 2 is a plan view of the fuel pump and mounting taken on line 2—2 of Fig. 1.
Figure 11:
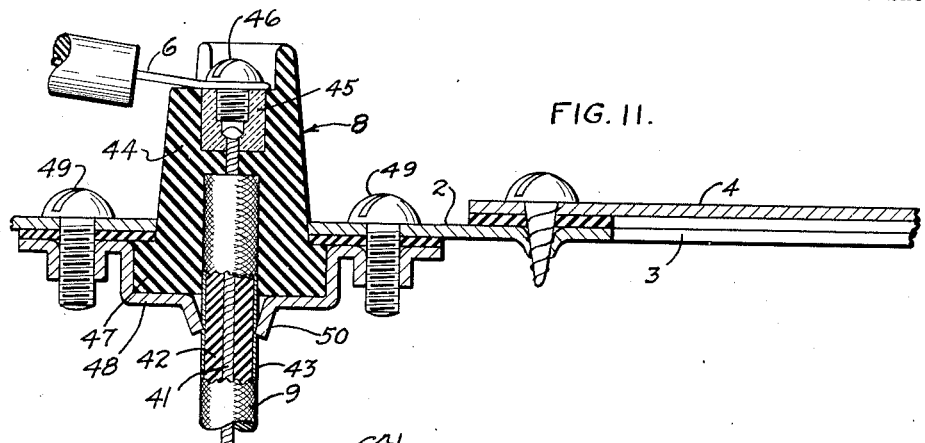
Fig. 11 is a sectional view of the electrical connector shown in Fig. 10.
Figure 3:
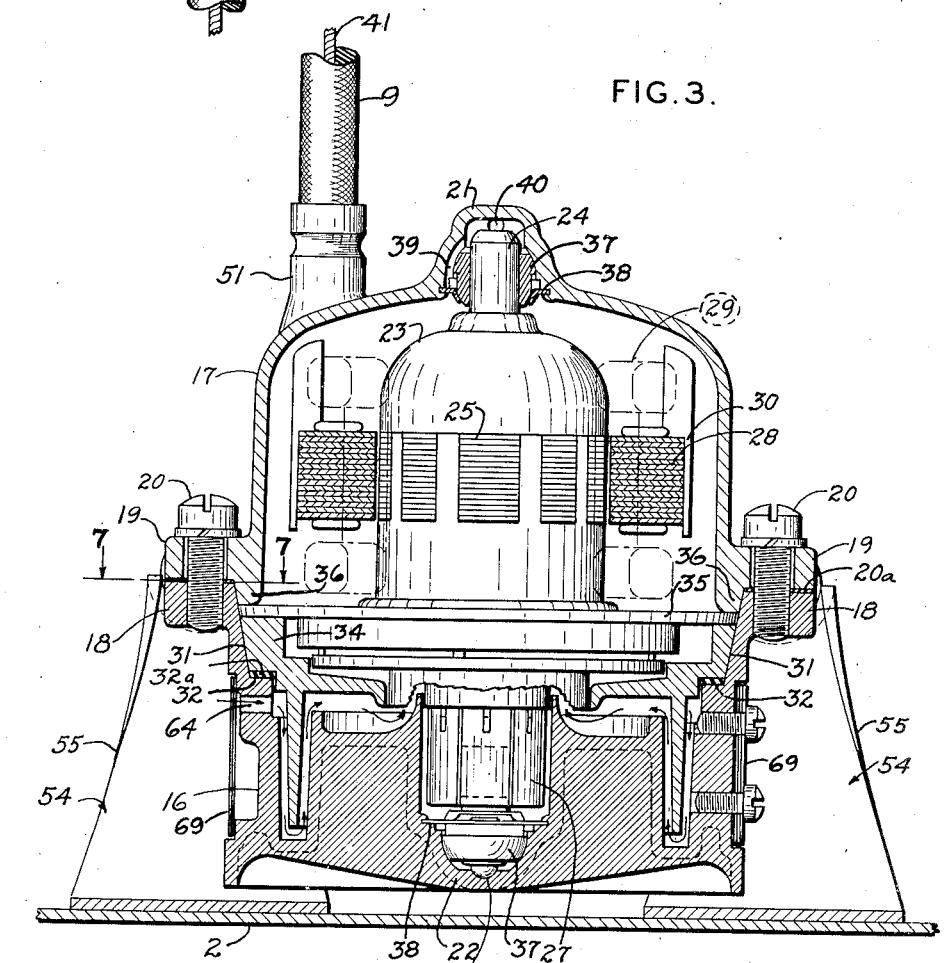
Fig. 3 is a vertical section taken on line 3—3 of Fig. 2.
Figure 10:
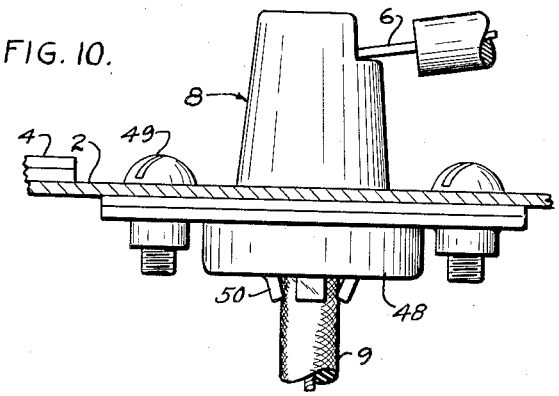
Fig. 10 is an enlarged detailed view of the electrical connector attached to the top of the fuel tank.
Figure 4:
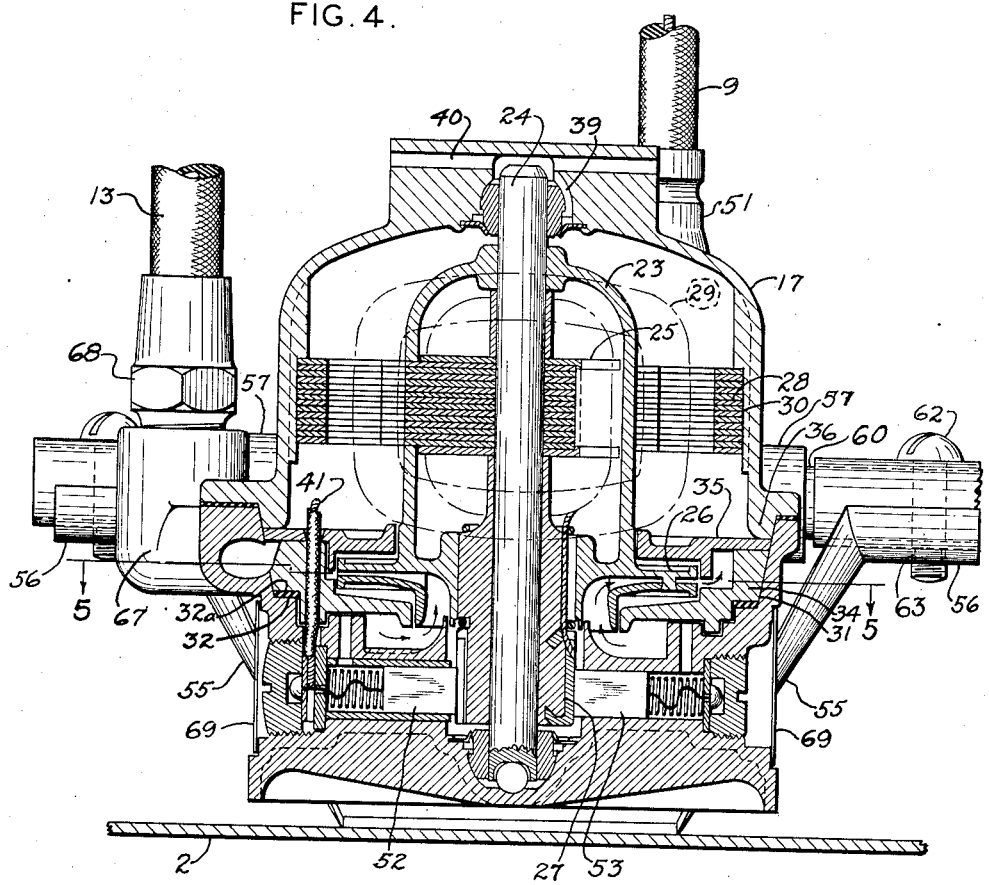
Fig. 4 is a vertical section taken on line 4—4 of Fig. 2.
Figure 5:
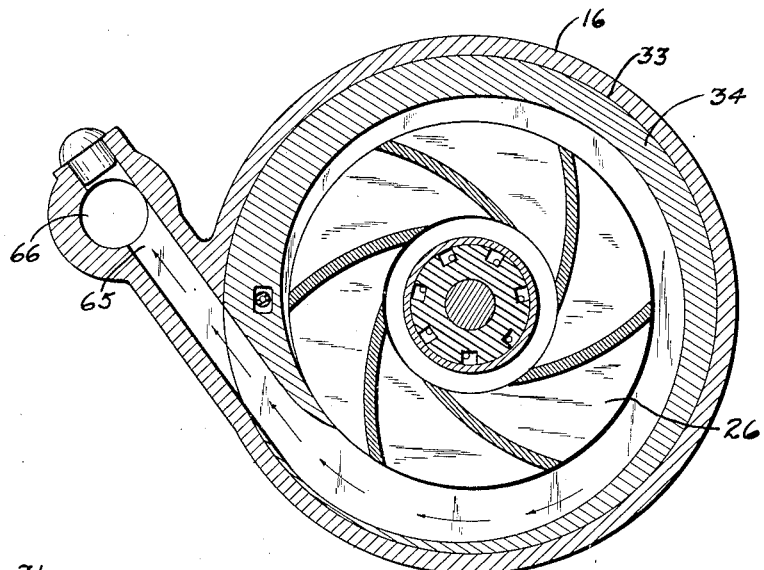
Fig. 5 is a transverse section taken on line 5—5 of Fig. 4, through the impeller and volute.

Referring to the drawings numeral 1 generally indicates an electrically driven centrifugal pump which is mounted in and on the bottom of a fuel storage tank 2. A hand-hole 3 in the top of the tank provides access to the pump. The hand-hole is provided with a cover plate 4. Electrical energy for the operation of the pump is supplied by a storage battery indicated at 5 and is conducted thereto through a circuit comprising a conductor 6 having a switch 7 interposed therein, a connector generally indicated at 8, a two-way conductor, generally indicated at 9, and grounds 10 and 11. Fuel is conducted from the pump to a tank fitting 12 by means of a flexible conductor 13 constructed of fuel resistant material, and therefrom to a carburetor 14 by means of a fuel line 15.

The fuel pump 1 comprises a lower casing 16 and an upper casing 17 which are attached by means of their respective flanges 18 and 19 and attaching screws 20. A sealing gasket 20a is provided between flanges 18 and 19. Rotating within the upper and lower casing and bearing in the respective ends 21 and 22 thereof is a rotor 23, which comprises, in rigid assembly, on a rotor shaft 24, an armature 25, an impeller 26 and a commutator 27. A laminated field frame 28 carrying a field winding 29 indicated by broken line is provided. The field frame is assembled in the upper casing 17 by press-fitting into the several vertical ribs or ways 30. The ribs 30 are comparatively narrow and are disposed in a circular formation which is concentrically true with the bearing end 21.

Figure 8:
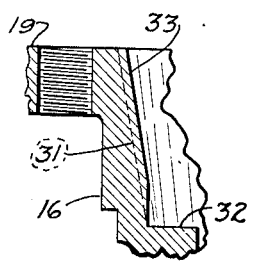
Fig. 8 is a sectional view of Fig. 7 taken on line 8—8.
Figure 9:
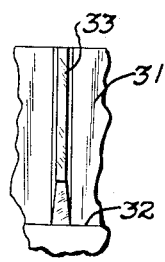
Fig. 9 is an elevation of Fig. 7 viewed on line 9—9.

The lower pump casing 16 is provided with a short tapered bore 31 at its upper end which terminates in a shoulder 32. Rising from the surface of bore 31 are a number of ribs 33 which are shown, enlarged out of proportion, in views Figs. 7, 8 and 9. Attempts to show these ribs in true proportion in the several views has been avoided for the reason that in practice it will be desirable to minimize the height to which they rise above the surface of the bore and which will probably be less than .015 of an inch. The ribs 33 are parallel to the surface of the bore 31.

Assembled in the bore 31 by press fitting is a circular volute member 34, a circular volute cover 35 and the lower tapered portion 36 of the top casing 17. The edges or rims of both members 34 and 35 and the lower portions 36 of casing 17 have substantially the same taper as bore 31. The volute member 34 and the cover 35 are firmly pressed downward by the lower end 36 of the top casing as the attaching screws 20 are tightened. A comparatively soft compressible ring gasket 32a is provided between volute member 34 and shoulder 32 which provides a seal and permits sufficient take-up of screws 20 to tightly compress the upper gasket 20a. In assembly the ribs 33 are compressed and flattened to a greater or lesser degree depending upon the dimensions of the components. It will be seen that by providing a tapered press fit assembly of the volute and its cover and of the upper and lower casing, concentricity which is highly essential, is assured.

Figure 7:
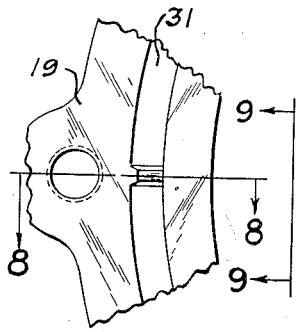
Fig. 7 is an enlarged fragmentary plan view of the lower pump casing taken on line 7—7 of Fig. 3, other assembled components being removed.
Figure 6:
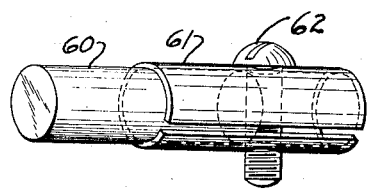
Fig. 6 is an enlarged detail of the resilient pump support and clamping tube.

By provision of the ribs 33, which are compressible by reason of their proportion, the manufacturer may work within limits ranging from a metal to metal fit to a substantial press fit. He may, therefore, allow the reasonable tolerances so necessary to economical production without sacrificing accuracy in assembly. A further advantage to be gained by provision of ribs 33 is that disassembly is greatly facilitated due to the fact that these ribs may be permanently distorted by reason of their dimensions without distorting the casing components. It is desirable that the ribs 33 be located immediately adjacent the attaching screws, as indicated in Fig. 7, for the reason that pressure applied by tightening these screws is thereby transmitted more directly to the points of resistance, this eliminates the possibility of distorting the top casing flange 19.

For journalling the ends of rotor shaft 24 a pair of radial self-aligning bearings 37 retained in the upper and lower ends of the pump casing by suitable retainers 38 are provided and to take the vertical thrust a ball, thrust bearing 37a is provided. The upper casing 17 is further provided with vent passages 39 and 40 for the purpose of relieving pressure which may build up in the upper chamber which is defined by the casing 17 and the volute cover 35.

The two-way electrical conductor 9 comprises a flexible central conductor 41 which is surrounded by an insulator 42 which, in turn, is surrounded by a flexible, braided covering 43 which also serves as a conductor. The inner conductor 41 is connected to the conductor 6 and the outer conductor 43 is connected to the metal fuel tank 2 by means of the connector 8 which is inserted upwardly through a perforation in the top of tank 2. The connector 8 comprises a nonconducting member 44 having an upwardly extending bore which receives the conductor 9. The inner conductor 41 is farther extended upwardly and is connected to conductor 6 through the insert 45 and screw 46. The non-conducting member 44 is provided with a lower flange portion 47 which provides a stopping shoulder. A cup-shaped retainer 48 attached to the underside of the top of the tank by screws 49 firmly holds the member 44 in place. The retainer 48 is provided with a central perforation through which passes the conductor 9, and a plurality of surrounding, downwardly formed tangs 50 which, after the insertion of conductor 9, are formed inward to rigidly clamp the conductor in place. The other end of conductor 9 is clamped in a perforated boss 51 on the casing 17 by rotary swaging. The inner conductor 41 extends downwardly into the pump casing and is connected to the field 29 and the commutator brush 52. Brush 52 is insulated from the pump casing. The armature is grounded to the pump casing through brush 53, and the outer casing 43 of conductor 9 completes the ground to the tank 2. Tank 2 is usually grounded to the frame in most automotive installations as well as the battery.

The pump is mounted on a pair of U-shaped brackets 54 which may be spot-welded or rigidly attached at their base in any suitable manner to the bottom of tank 2. The upwardly extending bracket legs 55 have their end portions 56 formed so as to be substantially horizontal. The edges of ends 56 are further formed upward to result in their having a semi-circular section. Four cylindrical bosses 57 cast integral with the lower pump casing are provided. The brackets 54 are so arranged with respect to the pump that the axis of the cylindrical bosses 57 coincide with an axis through the center of the semicircular bracket end portion 56. The bosses 57 have longitudinal blind bores 59 which receive one end of the resilient cylindrical shear pins 60. We prefer to construct the pins 60 of a commercial synthetic material having properties similar to rubber, except that they shall not be affected by gasoline as rubber is. The other ends of pins 60 are inserted in split clamping tubes 61. Tubes 61 are provided with through perforations to receive screws 62. The bracket end portions 56 are also perforated and internally screw threaded as indicated at 63 to receive screws 62.

In assembly, one end of a resilient pin 60 is inserted in a clamp tube 61, the other end into a bore 59 in a boss 57. A screw 62 is then inserted through the tube 61 and tightly engaged in a threaded bracket end 56 thereby tightly clamping the pin in the split tube and attaching both to the bracket.

Pump casing 16 is further provided with inlet ports 64, a discharge port 65 and a short outlet riser 66 formed in an outlet boss 67. The outlet boss being internally screw threaded to receive a conduit fitting 68. A circular screen 69 covering inlet port 64 is provided.

In operation, fuel flows into the lower casing through port 64, from whence it flows in the direction of the arrows into the central opening of the impeller 26, from where it is thrown by centrifugal force outward through the volute channel and port 65.

The detailed drawings and description are intended to be illustrative, not limiting and the use of all modifications within the scope of the appended claims is contemplated.

We claim:

1. A housing for a centrifugal pump comprising generally cylindrical male and female components, said male component having a portion of its outer surface tapered at one end, said female component being provided with a bore of similar taper at one end and of sufficient size to loosely receive the tapered end of said male component to a predetermined depth, said tapered bore having a plurality of circumferentially spaced, longitudinally extending ribs formed as an integral part of the wall of said bore and rising radially to a point sufficiently above the surface thereof to result in their partial distortion when said male component is inserted to said predetermined depth, and attaching means whereby pressure may be conveniently applied to force said insertion and maintain the attachment of said components.

2. In a centrifugal pump, a rotor, housing structure for said rotor comprising a pair of casings each having an open end and each being provided with a bearing in its opposite end for journalling one end of said rotor, one of said casings being provided with a circular longitudinally tapered male portion surrounding its open end, the other of said casings being provided with a similarly tapered counterbore at its open end of sufficient size to loosely receive said male portion to a predetermined depth, the surface of said tapered bore being provided with a plurality of circumferentially spaced, compressible projections formed as an integral part of the wall of said bore and rising to a point sufficiently above the surface of said bore to result in their partial distortion when inserting said tapered male portion to said predetermined depth, one of said bearings being concentric with said circular tapered male portion, the other of said bearings being concentric with a circle touching the tops of said projections, and means for attaching said casings.

3. In a centrifugal pump, a generally cup-shaped casing, a vertical rotor, a bearing supported in the bottom of said casing for journalling one end of said rotor, a volute member surrounding said rotor, said volute member having a circular, longitudinally tapered outer rim, the upper open end of said casing being provided with a tapered counterbore of such size as to loosely receive said volute member, a plurality of circumferentially spaced integral bosses rising from the wall of said counterbore to such height as to cause their partial distortion when inserting said volute member into said counterbore and means including a second casing whereby pressure may be exerted to force the insertion of said volute member.

4. In a centrifugal pump, a vertical rotor, housing structure for said rotor comprising a pair of generally cup-shaped casings, each of said casings being provided with companion flanges surrounding their open ends, each of said casings being provided with a bearing in the closed end thereof for journalling one end of said rotor, one of said casings having a circular, male portion extending beyond said flange at its open end, said other casing being provided with a bore at its open end adapted to loosely receive said male portion, a plurality of circumferentially spaced ribs projecting from the wall of said bore to a height whereby they will be partially deformed when said male portion is inserted in said bore, and screw threaded means for attaching said flanges.

5. As an article of manufacture a rotary pump housing component adapted to interchangeable unit assembly comprising a generally cylindrical casing having one open end, said component being taper counterbored at its open end and being further characterized by a plurality of circumferentially spaced, longitudinally extending ribs rising from the wall of said tapered counterbore and being formed as an integral part of said casing, the top surface of said ribs being substantially parallel to the wall of said tapered bore, and a journal supported in the opposite end of said casing and being disposed concentrically with a circle touching the tops of said ribs.

6. Housing structure for a rotary pump comprising a pair of casings each having one open end, one of said casings being provided with a circular tapered outer surface surrounding its open end, the other of said casings being provided with a similarly tapered inner surface at its open end and of such size as to loosely receive the tapered outer surface of said first-mentioned casing to a predetermined depth, and a plurality of circumferentially spaced ribs formed as an integral part of one of said tapered surfaces and projecting radially therefrom sufficiently to cause their partial distortion when said tapered outer surface is inserted to said predetermined depth.

ALFRED C. KORTE.
KENNETH LANNERT.